United States Patent Office 3,699,106
Patented Oct. 17, 1972

3,699,106
6,7 BENZO-2-(4-PHENYL-1-PIPERAZINYL) BICYCLO[3.3.1]NONAN-9-ONE
Frederick Edmund Ward, Elkhart, Ind., assignor to Miles Laboratories, Inc., Elkhart, Ind.
No Drawing. Filed Mar. 26, 1971, Ser. No. 128,587
Int. Cl. C07d 51/70
U.S. Cl. 260—268 TR    4 Claims

ABSTRACT OF THE DISCLOSURE

The isomeric axial and equatorial 6,7-benzo-2-(4-phenyl-1-piperazinyl)bicyclo [3.3.1]nonan-9-ones are novel compounds with tranquilizing activity.

SUMMARY OF THE INVENTION

This invention relates to the synthesis of the axial and equatorial isomers of 6,7-benzo-2-(4-phenyl-1-piperazinyl) bicyclo[3.3.1]nonan-9-one. These compounds are useful as tranquilizers when administered orally or intraperitoneally to warm blooded animals at a dosage of 30 to 100 mg./kg. of body weight.

DESCRIPTION OF THE PREFERRED EMBODIMENT

The compounds of the present invention are conveniently prepared by the reaction of acrolein with 2-(4-phenylpiperazinyl)-3,4-dihydronaphthalene at room temperature and in an inert solvent such as benzene or dimethylformamide. Upon completion of the reaction, the solvent is removed under vacuum and the residue is dissolved in 2-propanol and diluted with petroleum ether. When the resulting solution is cooled, the desired axial isomer named above precipitates and is purified by recrystallization from chloroform or ether. The filtrate is dissolved in benzene and chromatographed on alumina. The benzene eluent is evaporated and the residue recrystallized from a benzene-petroleum ether mixture to obtain the desired equatorial isomer previously named. These isomers have vastly different melting points and their structures are readily distinguished by infrared techniques.

The dihydronaphthalene compound employed as a starting material is prepared by refluxing a benzene solution containing beta tetralone and 4-phenylpiperazine in equimolar amounts. The solvent is evaporated and the 2-(4-phenylpiperazinyl)-3,4-dihydronaphthalene is obtained by recrystallization from benzene as a crystalline solid melting at 128° C.

EXAMPLE

A solution of 20 grams of acrolein in 50 ml. of dry benzene was added dropwise to a suspension of 34.1 grams of 2-(4-phenylpiperazyl)-3,4-dihydronaphthalene in 200 ml. of dry benzene with constant stirring at room temperature. After stirring overnight, the solvent was removed under vacuum and the residue was dissolved in boiling 2-propanol. Upon the addition of petroleum ether and cooling, the axial isomer of 6,7-benzo-2-(4-phenyl-1-piperazinyl)bicyclo[3.3.1]nonan-9-one precipitated and was recrystallized from a chloroform-ether mixture to obtain 4 grams of the same melting at 202° C.

The filtrate was dissolved in benzene and chromatographed on alumina. The eluent was evaporated and the residue was dissolved in a benzene-petroleum ether mixture. This mixture was cooled and filtered. When the filtrate was cooled, 4 grams of the equatorial isomer of 6,7-benzo-2-(4-phenyl-1-piperazinyl) - bicyclo[3.3.1]nonan-9-one deposited as a crystalline solid which melted at 138° C. Elemental analysis and infrared spectra confirmed the structure of the two isomers.

As previously stated, the compounds of this invention may be used as tranquilizing agents. In representative operations, the central nervous system activity of said compounds was assessed in mice subjected to a battery of observational tests by which behavioral, neurological and autonomic effects could be detected. Intraperitoneal doses of 30 mg./kg. of the axial isomer and 100 mg./kg. of the equatorial isomer described hereinbefore produced a state of central nervous system depression characterized by decreased spontaneous activity. In addition, the axial isomer disrupted conditioned avoidance responses of rats which according to Cook and Catania, Fed. Proc. 23, 818 (1964) is indicative of tranquilizing activity.

The intraperitoneal $LD_{50}$ of both isomers in mice was found to be greater than 1000 mg./kg.

What is claimed is:

1. A compound selected from the group consisting of the axial and equatorial isomers of 6,7-benzo-2-(4-phenyl-1-piperazinyl)bicyclo[3.3.1]nonan-9-one.

2. A compound as in claim 1 which is the axial isomer of 6,7-benzo-2-(4-phenyl-1-piperazinyl) - bicyclo[3.3.1]nonan-9-one.

3. A compound as in claim 1 which is the equatorial isomer of 6,7-benzo-2-(4-phenyl-1-piperazinyl)bicyclo [3.3.1]nonan-9-one.

4. A method of preparing the axial and equatorial isomers of 6,7-benzo-2-(4-phenyl-1-piperazinyl)bicyclo [3.3.1]nonan-9-one which consists essentially of reacting acrolein with 2-(4-phenylpiperazinyl) - 3,4 - dihydronaphthalene in an inert solvent at room temperature and separating the isomers thus formed by fractional crystallization of the reaction mixture.

References Cited

UNITED STATES PATENTS

| | | | |
|---|---|---|---|
| 3,502,669 | 3/1970 | Wakanishi et al. | 260—268 BC |
| 3,494,923 | 2/1970 | Gubitz | 260—268 TR |
| 3,153,039 | 10/1964 | Kriegen | 260—268 TR |

DONALD G. DAUS, Primary Examiner

U.S. Cl. X.R.

260—268 BC; 424—250